Patented Oct. 8, 1940

2,217,611

UNITED STATES PATENT OFFICE

2,217,611

TERPENE-CYANOACYL COMPOUND AND METHOD OF PRODUCING THE SAME

Joseph N. Borglin, Wilmington, Del., assignor to Hercules Powder Company, Wilmington, Del., a corporation of Delaware No Drawing. Application March 29, 1938, Serial No. 198,687. Renewed June 6, 1940

22 Claims. (Cl. 260—454)

This invention relates to a new series of terpene compounds, and more particularly to a new series of terpene compounds having the type formula ROOCR'XCN in which R is a terpene radical, R' is an aliphatic or aromatic radical and X is a member of the group consisting of sulfur, selenium and tellurium, and to a method for the production thereof.

This new series of compounds are active insecticides and are, therefore, useful in insecticidal compositions. They are, in addition, useful as intermediates for the production of other useful compounds. Thus, for example, they may be oxidized by treatment with nitric acid to produce valuable wetting agents.

By the method in accordance with this invention, I react a terpene which contains one or more double bonds or which contains one or more hydroxyl groups within its structure, with a halogenated organic acid and then with a metal thiocyanate, a metal selenocyanate or a metal tellurocyanate, which is reactive under the conditions employed.

The terpene which I employ may be an unsaturated terpene hydrocarbon such as, for example, pinene, terpinene, terpinolene, camphene, fenchene, dipentene, menthene, allo-occimene, etc., or commercial mixtures of terpene hydrocarbons such as, for example, turpentine, etc. Again, it may be a saturated or unsaturated terpene alcohol such as, for example, terpineol, borneol, fenchyl alcohol, hydroterpineol, etc., or commercial mixtures thereof, such as, for example, pine oil, etc., or it may be a terpene ether such as, for example, anethol, estragol, methylchavicol, terpinylmethyl ether, terpinylethyl ether, terpinylpropyl ether, terpinylbutyl ether, diethylene glycol ether of pinene, glycol ether of pinene, glycerol ether of pinene, etc.

The halogenated organic acid which I use may be, for example, monochloroacetic acid, dichloroacetic acid, trichloroacetic acid, alpha-chloropropionic acid, beta-chloropropionic acid, chlorobenzoic acid, chlorocrotonic acid, chloromalonic acid and chlorophthalic acid, etc., and the corresponding bromine and iodine substituted acids.

The metal thiocyanate which I use may be any metal thiocyanate which is reactive under the conditions employed. To be reactive under the conditions employed, it must be partially or completely soluble in the reaction mixture utilized. Suitable metal thiocyanates, for example, are sodium thiocyanate, potassium thiocyanate, lithium thiocyanate, ammonium thiocyanate, etc. When it is desired to make the terpene selenocyanate, the metal selenocyanate I may use, may be, for example, sodium selenocyanate, potassium selenocyanate, lithium selenocyanate, ammonium selenocyanate, etc., and similarly, the metal tellurocyanate which I may use, may be, for example, sodium tellurocyanate, potassium tellurocyanate, lithium tellurocyanate, ammonium tellurocyanate, etc.

The reaction in accordance with this invention will desirably be carried out in two steps. The terpene compound will first be reacted with a halogenated acid and the resulting halogen acid ester of the terpene isolated from the by-products of the reaction. The second stage of the reaction is the treatment of this halogen acid ester of the terpene with the metallic thiocyanate, selenocyanate, or tellurocyanate, as the case may be. I prefer to carry out each of these steps in the presence of a suitable inert solvent and each of them may be carried out at any temperature within the range of about 0° C. to about 250° C., and preferably within the range of about 60° C. to about 120° C.

The method in accordance with this invention will be further illustrated by the examples which follow:

EXAMPLE I

Fenchyl thiocyanoacetate

A mixture of 400 g. of fenchyl alcohol, 275 g. monochloroacetic acid and 25 cc. toluene were refluxed for 16 hours, and the toluene and excess reagents were distilled off under reduced pressure to leave a product which analyzed 13.9% chlorine. The theoretical chlorine content of fenchyl monochloroacetate is 14.5%. One hundred grams of this fenchyl chloroacetate, 50 g. of potassium thiocyanate, and 100 g. of ethyl alcohol were refluxed for 5 hours and washed with water to remove the alcohol and any residual potassium thiocyanate from the product. The product was then dried and found to weigh 97 g. It had the following analysis:

| | Per cent by weight |
|---|---|
| Chlorine | 0.26 |
| Sulfur | 11.06 |
| Refractive index at 20° C. $[\alpha]_D$ | 1.5000 |

This analysis showed the product to be 90% pure fenchyl thiocyanoacetate.

EXAMPLE II

Fenchyl alpha-thiocyanopropionate

Two hundred grams of alpha-chloropropionic acid and 800 grams of fenchyl alcohol were refluxed for 8 hours at a temperature of 160-170° C. The product was then distilled under reduced pressure, to remove excess reagents, to yield 190 grams of fenchyl alpha-chloropropionate which gave the following analysis:

Acid number _____ 3.3
Chlorine content_____per cent by weight__ 14.2

Eighty-three and one half grams of this fenchyl alpha-chloropropionate, 30 grams of potassium thiocyanate and 100 grams of ethyl alcohol were then refluxed for 8 hours, water was added to dissolve the precipitated potassium chloride and the oily liquid product decanted, washed with water and dried. Eighty-two grams of the product were recovered. This product analyzed 7.5% by weight of sulfur, showing it to be about 67% pure fenchyl alpha thiocyanopropionate.

EXAMPLE III

*Mixed bornyl-fenchyl thiocyanoacetate*

One hundred fifty grams of monochloroacetic acid and 550 grams of a pine oil fraction which contained 60% by weight, of a mixture of fenchyl alcohol and borneol were refluxed for 4 hours at 180° C. The reaction product was fractionated under reduced pressure to yield 417 grams of mixed bornyl-fenchyl monochloroacetate, containing 11.16% by weight chlorine and some polymerized terpenes. Two hundred grams of this product, 75 grams of potassium thiocyanate and 100 grams of ethyl alcohol were refluxed for 8 hours. The product was recovered from the reaction mixture by washing with water, and then dried. In this manner, 215 parts by weight of a mixed bornyl-fenchyl thiocyanoacetate were recovered. This product analyzed:

Percent by weight
Chlorine _____ 0.4
Sulfur _____ 9.31

This analysis showed the product to be about 72% mixed terpene thiocyanoacetate.

EXAMPLE IV

*Bornyl thiocyanoacetate from pinene*

One hundred and fifty grams of monochloroacetic acid and 350 grams of pinene were heated for 12 hours at 125° C. and for 4 hours at 140° C. and finally steam-distilled to remove any unreacted reagents. A 70% yield (254 grams) of bornyl monochloroacetate was obtained, which analyzed as follows:

Acid number _____ 1.0
Chlorine content_____percent by weight__ 7.05

Seventy-six grams of this bornyl monochloroacetate, 25 parts by weight of potassium thiocyanate and 100 grams of ethyl alcohol were refluxed for 8 hours. The reaction mixture was then washed with water and the oily product obtained thereby dried to yield 69.5 parts by weight of a product which analyzed as follows:

Percent by weight
Chlorine _____ 0.4
Sulfur _____ 9.3

This analysis shows the product to be about 72% pure bornyl thiocyanoacetate.

EXAMPLE V

*Isobornyl thiocyanoacetate from camphene*

Two hundred grams of camphene and 150 grams of chloroacetic acid were heated 16 hours at 125° C., cooled to room temperature and the resulting product washed with water. In this way, 177 grams of isobornyl monochloroacetate, analyzing 12.8%, by weight, chlorine was recovered. One hundred and seventy-four grams of the isobornyl monochloroacetate was dissolved in 300 cc. of ethyl alcohol, 100 grams of potassium thiocyanate added to this solution and the mixture refluxed for a period of 8 hours. Two hundred and seventy-six grams of a product was recovered, which analyzed as follows:

Per cent by weight
Chlorine _____ 0.2
Sulfur _____ 10.9

This analysis shows the product to be principally isobornyl thiocyanoacetate.

It will be understood that the details and examples given herein are by way of illustration and not by way of limitation of the invention as broadly described and claimed.

What I claim and desire to protect by Letters Patent is:

1. A new terpene compound having the type formula ROOCR'XCN in which R is a terpene radical, R' is a radical selected from the group consisting of aliphatic radicals and aromatic radicals and X is a member of the group consisting of sulfur, selenium, and tellurium.

2. A new terpene compound having the type formula ROOCR'SCN in which R is a terpene radical and R' is a radical selected from the group consisting of aliphatic radicals and aromatic radicals.

3. A new terpene compound having the type formula ROOCR'TeCN in which R is a terpene radical and R' is a radical selected from the group consisting of aliphatic radicals and aromatic radicals.

4. A new terpene compound having the type formula ROOCR'SeCN in which R is a terpene radical and R' is a radical selected from the group consisting of aliphatic radicals and aromatic radicals.

5. A new terpene compound having the type formula ROOCR'SCN in which R is a terpene radical and R' is an aliphatic radical.

6. A terpene thiocyanoacetate.
7. A fenchyl thiocyanoacyl ester.
8. A fenchyl thiocyanoacetate.
9. A fenchyl thiocyanopropionate.
10. A bornyl thiocyanoacyl ester.
11. A bornyl thiocyanoacetate.
12. A method for the production of the new terpene compound described in claim 1, which consists of reacting a terpene compound selected from the group consisting of unsaturated terpene compounds and saturated terpene alcohols with a halogenated organic carboxylic acid and then with a compound selected from the group of metal thiocyanates, metal selenocyanates and metal tellurocyanates, which are at least partially soluble in the reaction mixture.

13. A method for the production of the new terpene compound described in claim 1, which consists of reacting a terpene compound selected from the group consisting of unsaturated terpene compounds and saturated terpene alcohols with a halogenated organic carboxylic acid and then with a metal thiocyanate which is at least partially soluble in the reaction mixture.

14. A method for the production of the new terpene compound described in claim 1, which consists of reacting a terpene compound selected from the group consisting of unsaturated terpene compounds and saturated terpene alcohols with a halogenated organic carboxylic acid and then with an alkali metal thiocyanate.

15. A method for the production of the new terpene compound described in claim 1, which consists of reacting a terpene compound selected from the group consisting of unsaturated terpene compounds and saturated terpene alcohols with a chlorinated organic carboxylic acid and then with an alkali metal thiocyanate.

16. A method for the production of the new terpene compound described in claim 1, which consists of reacting a terpene compound selected from the group consisting of unsaturated terpene compounds and saturated terpene alcohols with a chlorinated aliphatic organic carboxylic acid and then with an alkali metal thiocyanate.

17. A method for the production of the new terpene compound described in claim 1, which consists of reacting an unsaturated terpene hydrocarbon with a chlorinated aliphatic organic carboxylic acid and then with an alkali metal thiocyanate.

18. A method for the production of the new terpene compound described in claim 1, which consists of reacting an unsaturated terpene alcohol with a chlorinated aliphatic organic carboxylic acid and then with an alkali metal thiocyanate.

19. A method for the production of the new terpene compound described in claim 1, which consists of reacting a saturated terpene alcohol with a chlorinated aliphatic organic carboxylic acid and then with an alkali metal thiocyanate.

20. A new terpene compound having the type formula ROOCR'SCN in which R is a terpene secondary alcohol radical and R' is an aliphatic radical.

21. Fenchyl alpha-thiocyanopropionate.

22. Isobornyl thiocyanoacetate.

JOSEPH N. BORGLIN.